(12) United States Patent
Tayloe et al.

(10) Patent No.: US 11,922,434 B2
(45) Date of Patent: *Mar. 5, 2024

(54) SYSTEMS AND METHODS FOR MERGING A VIRTUAL WORLD, LIVE EVENTS AND AN ENTERTAINMENT CHANNEL

(71) Applicant: MWE Live, LLC, Hermosa Beach, CA (US)

(72) Inventors: Kenneth Lloyd Tayloe, Los Angeles, CA (US); Paul Howard Glass, Westlake Village, CA (US); David Eugene Williamson, Jr., Richmond, VA (US); Jordan William Snider, Los Angeles, CA (US)

(73) Assignee: MWE Live, LLC, Hermosa Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,011

(22) Filed: Aug. 30, 2021

(65) Prior Publication Data

US 2021/0390561 A1  Dec. 16, 2021

Related U.S. Application Data

(60) Continuation of application No. 16/749,907, filed on Jan. 22, 2020, now Pat. No. 11,107,105, which is a continuation of application No. 14/924,350, filed on Oct. 27, 2015, now abandoned, which is a division of application No. 13/815,345, filed on Feb. 23, 2013, now abandoned.

(51) Int. Cl.
*A63F 13/79* (2014.01)
*A63F 13/795* (2014.01)
*G06Q 30/02* (2023.01)
*G06Q 30/0207* (2023.01)
*G06Q 50/00* (2012.01)
*H04L 67/131* (2022.01)

(52) U.S. Cl.
CPC .......... *G06Q 30/02* (2013.01); *A63F 13/795* (2014.09); *G06Q 30/0209* (2013.01); *G06Q 50/01* (2013.01); *H04L 67/131* (2022.05)

(58) Field of Classification Search
CPC .......... A63F 13/30; A63F 13/45; A63F 13/69; A63F 13/70; A63F 2300/575; A63F 2300/63
See application file for complete search history.

(56) References Cited

U.S. PATENT DOCUMENTS

| | | |
|---|---|---|
| 9,479,602 B1 | 10/2016 | Paradise |
| 2006/0293103 A1 | 12/2006 | Mendelsohn |

(Continued)

*Primary Examiner* — Omkar A Deodhar
(74) *Attorney, Agent, or Firm* — Sheppard Mullin Richter & Hampton LLP

(57) ABSTRACT

Systems, methods and software merge a Virtual World, Live Event and Entertainment Channel, thus creating "The Perfect Storm" of gaming and entertainment whereby the characters of a social network game (e.g., an online fantasy sports league) are represented by human beings who register to be avatars of characters supported by a "Character Service Center," while players compete to bring avatars to life in a Real World event (e.g., a Real World sports league), where the human beings behind the avatars compete for prizes while staying in character, as these competitors and players are incentivized by a "Collaboration Incentive Platform."

21 Claims, 7 Drawing Sheets

(56) References Cited

U.S. PATENT DOCUMENTS

| | | |
|---|---|---|
| 2008/0221998 A1 | 9/2008 | Mendelsohn |
| 2010/0030578 A1 | 2/2010 | Siddique |
| 2012/0238367 A1 | 9/2012 | Kido |
| 2014/0106858 A1 | 4/2014 | Constable |
| 2014/0179442 A1 | 6/2014 | Quinlivan |
| 2014/0243094 A1 | 8/2014 | Tayloe |
| 2015/0024837 A1 | 1/2015 | Ganz |
| 2016/0027260 A1 | 1/2016 | Pierce |
| 2016/0210602 A1 | 7/2016 | Siddique |
| 2016/0214017 A1 | 7/2016 | Krietzman |
| 2017/0006322 A1 | 1/2017 | Dury |
| 2017/0148267 A1 | 5/2017 | Parker |
| 2018/0025373 A1 | 1/2018 | Perriman |

SYSTEMS AND METHODS FOR MERGING A VIRTUAL WORLD, LIVE EVENTS AND AN ENTERTAINMENT CHANNEL

CROSS-REFERENCE TO RELATED APPLICATIONS

This application is a continuation of U.S. patent application Ser. No. 16/749,907, filed Jan. 22, 2020, entitled "SYSTEMS AND METHODS FOR MERGING A VIRTUAL WORLD, LIVE EVENTS AND AN ENTERTAINMENT CHANNEL", Which is a continuation of U.S. patent application Ser. No. 14/924,350, filed Oct. 27, 2015, entitled "SYSTEMS, METHODS AND SOFTWARE APPLICATIONS FOR MERGING A VIRTUAL WORLD, LIVE EVENTS AND AN ENTERTAINMENT CHANNEL" (now abandoned), which is a division of U.S. patent application Ser. No. 13/815,345, filed Feb. 23, 2013, entitled "SYSTEMS, METHODS AND SOFTWARE APPLICATIONS FOR MERGING A VIRTUAL WORLD, LIVE EVENTS AND AN ENTERTAINMENT CHANNEL" (now abandoned), which are hereby incorporated herein by reference in their entirety.

FIELD

The present application (1) generally relates to systems, methods and software applications for providing digital television services, Internet services, telecom services and/or company services, and (2) specifically relates to systems, methods and software applications for merging a Virtual World, Live Events and an Entertainment Channel, including the creation of a social network game that is played within a Virtual World that comes to life in Live Events.

BACKGROUND OF THE INVENTION

Online social network games and fantasy sports leagues are evolving and growing, but their developers have not envisioned and/or figured out how to create and roll-out a social network game that is played within a Virtual World that comes to life in Live Events, while rewarding and energizing the entrepreneurial developers, player participants and fan base in a manner that can stimulate viral growth online and offline. In addition, to the present invention envisioning this roll-out moving from the Virtual World and coming to life in the Real World via Live Events, the present invention envisions the reverse happening, whereby such roll-out originates and moves from the Real World via Live Events to the Virtual World. In each of these instances the systems, methods and software applications for merging a virtual world, live events and an entertainment channel that are disclosed in the present invention (individually or collectively), such as the "Character Service Center" (CSC) and the "Collaborative Incentive Platform" (CIP), can be used to reward and energize the entrepreneurial developers, player participants and fan base in a manner that can stimulate viral growth online and offline, whether the roll-out movement originates in the Virtual World or the Real World.

A Virtual World is an online community that takes the form of a computer-based simulated environment through which users can interact with one another and use and create objects. The term has become largely synonymous with interactive 30 virtual environments, where the users take the form of avatars visible to others. These avatars usually appear as textual, two-dimensional, or three-dimensional representations, although other forms are possible. An avatar is the graphical representation of the user or the user's alter ego or character. It is an object representing the user. The term "avatar" can also refer to the personality connected with the screen name, or handle, of an Internet user. Generator tools and services have been created to meet the demand for millions of unique, customized avatars. These solutions bring together complex 3D modeling, consumer ease of use and fully interoperable avatars.

Existing fantasy sports leagues have NOT blended (1) a Virtual World that contains a social network game (e.g., an online fantasy sports league), including an online gaming platform for avatars to interact with fans online; (2) Live Events that push a portion of the avatars to life in a Real World sports league, with real competition for real cash and improvisational drama; and (3) an Entertainment Channel that airs original content (e.g., ESPN meets Comedy Central) that excites and informs the fan base . . . all the while, synergistically growing participation, fan viewing and income streams; thus establishing the of the "Holy Grail" of online gaming, broadcast shows and live entertainment (aka "The Perfect Storm") that merges the branches referred to individually as: (a) Virtual World, (b) Live Events and (c) Entertainment Channel. This invention represents the development of an integrated multi-platform that embraces and promotes social trans-media optimization via a two-way conduit for bringing fans, entertainment and products together, while bringing entertainment distributors and product manufacturers an ever-expanding lucrative fan-base demographic.

Existing fantasy sports leagues have NOT created a social network game where players compete via collective use of avatars in a Virtual World sports league for rewards and/or to push a portion (e.g., 20%) of the avatars to life in a Real World sports league wrapped in an "Improvisational Sports Theatre" act based on a professional sport where the athletes are actors competing for cash prizes while staying in character, thus blending the Virtual World with the Real World.

Conversely, existing real sports leagues have NOT promoted athletes competing in live events that push a portion (e.g., 20%) of Real World sports league competitors to avatar status in a Virtual World sports league, with virtual competition for real cash prizes and online drama, thus blending the Virtual World with the Real World.

Existing fantasy sports leagues have NOT tapped the social gaming world in the way this invention drives characters and fans to promote the online Virtual World sports league, then pushes a portion of the top shelf online characters to compete in Real World sports league competition, while they host, act and mingle with the fans; thus virally growing real participation and real profits for the entrepreneurial owners of these fantasy sports leagues, while being rewarded themselves. A fantasy sports league is shown within the present application how to do this by using one or more inventions disclosed in the present application (individually or collectively), such as the "Character Service Center" (CSC) and the "Collaborative Incentive Platform" (CIP).

Conversely, existing real sports leagues have NOT tapped the social gaming world in the way this invention drives athletes and fans to promote the Real World sports league, and then pushes a portion of the top shelf athletes to compete in Virtual World sports league competition. A Real World sports league is shown within the present application how to do this by using one or more inventions disclosed in the present application (individually or collectively), such as the "Character Service Center" (CSC) and the "Collaborative Incentive Platform" (CIP). As an example, the Real World sports league could direct all, or part, of its athletes and all, or part, of its fans to join the "social network game" that is present in the Virtual World, in order to see the league's athletes compete for elevated status, such as being the top ranked athlete and top ranked avatar. In this way, both the Virtual World and the Real World sports leagues can simultaneously and synergistically create expanded growth for both leagues by capitalizing on new innovative promotional marketing via the CSC and CIP, including any, or all, available social media venues and technologies that could be employed.

Social Network Game

A social network game is a type of online game that is played through social networks, and typically features multiplayer and asynchronous gameplay mechanics. A multiplayer video game is one which more than one person can play in the same game environment at the same time. Social network games are most often implemented as browser games, but can also be implemented on other platforms such as mobile devices. They are amongst the most popular games played in the world, with several products with tens of millions of players. (Lil) Green Patch, Happy Farm, Farm Town, YoVille and Mob Wars were some of the first successful games of this genre. Frontier Ville, CityVille, Gardens of Time and The Sims Social are more recent examples of very popular social network games.

Companies that make social network games include market leader Zynga, 5 Minutes, Playfish, Playdom, Kabam, Crowdstar, RockYou, Booyah, Row Sham Bow, Inc., etc.

Social Games

Dutch historian Johan Huizinga defines play as:

"Summing up the formal characteristic of play, we might call it a free activity standing quite consciously outside 'ordinary' life as being 'not serious' but at the same time absorbing the player intensely and utterly. It is an activity connected with no material interest, and no profit can be gained by it. It proceeds within its own proper boundaries of time and space, according to fixed rules and in an orderly manner. It promotes the formation of social groupings that tend to surround themselves with secrecy and to stress the difference from the common world by disguise or other means." Huizinga, J. (1955) (*A Study of the Play—Element in Culture*; Boston: Beacon Press).

Note the mention of social groupings in Huizinga's definition of play, indicating the importance of social factors in an environment of play. Social network games are games in essence, riding on some form of social network as the gaming platform. They follow the same game features as outlined by Juul, J. (2003) (*The Game, the Player, the World: Looking for a Heart of Gameness*; Utrecht: Utrecht University):

1. Rules: Games are based on rules.
2. Variable, quantifiable outcomes: Games have variable, quantifiable outcomes.
3. Values assigned to possible outcomes: Games have different values assigned to different potential outcomes.
4. Player effort: The outcomes of games are influenced by the players' effort.
5. Player attached to outcome: Each player of a game is attached to the outcomes.
6. Negotiable consequences: Games can be played according to the same rules with or without real-life consequences.

Technology and Platforms

A social network video game can be created with any number of traditional video game technologies; however, the majority is implemented in Adobe Flash, PHP or JavaScript. Some games may use a combination of these technologies.

A social network game is often played via a web browser, though they are distinct from browser based games in the way they leverage the player's social graph and individual user data that is hosted on the social network. With the invention of smartphone devices, social games have now also seen widespread adoption on mobile platforms such as iOS and Android devices. This is enabled through mobile social networks, such as OpenFeint and through Oauth implementations by social networking sites like Facebook which allow applications on mobile devices to access a limited amount of protected user data on those sites. Through an in-app connection to these networks, users can be provided with an experience very similar to that of a web based social game. It's been predicted that social gaming will bring over 6 billion dollars in revenue by 2013.

Distinct Features

A social video game may employ any of the following features:

Asynchronous gameplay which allows rules to be resolved without needing players to play at the same time.

Community: One of the most distinct features of social video games is in leveraging the player's social network. Quests or game goals may only be possible if a player "shares" his game with friends (connected via the social network hosting the game) or gets them to play as well as "neighbors" or "allies".

No victory conditions: Since most developers count on users playing their games often, there generally are no victory conditions. That is, the game never ends and no one is ever declared "winner". Instead, many casual games have "quests" or "missions" for players to complete. This is not true for board game-like social games, such as Scrabble.

Virtual currency: Social network games use "virtual currency", which players usually must purchase with real-world money. With the in-game currency players can buy upgrades that would otherwise take much longer to earn through in-game achievements. In many cases, some upgrades are only available via the virtual currency.

Attracting Gamers

Social Media Optimization: Social network games often leverage or promote social media optimization through either:

1. Social Network Persuasion: The use of social networks to recruit game allies, or
2. Social Proofing: Game design, linking social media activity and influence to game rewards.

Examples of the former approach include Farm Ville, FrontierVille and Mafia Wars. In these games a player's social network is exploited to recruit additional players and allies.

Illusion of Free: Consumer strategies are radically different from other kinds of online content. Instead of a fixed paywell deployed by games such as World of Warcraft where there is a monthly fee, social games offer an illusion of free entertainment. By presenting the purchase option as "your time vs. your money," social game designers tap into both our desire for choice and our sense of self-importance. Users are often prompted to purchase new items to speed up a time-consuming process or purchase otherwise limited game items. Playing the game is free, but if you want to get ahead, move faster, or get the really cool stuff, you need to spend real dollars.

Low Learning Curve: Designed for simplicity where some games mimic already well-known games, such as the widely popular Texas hold'em. Consumers that have not played video games before joined in on the games at accelerating rates. Women over 40 represent the fastest growing segment, since consumers can easily start and participate in social games and become regular users.

Low Technological Requirements: Enables users of social networks to play games from their computers without having specialized software or hardware to play the game. The technology that is used for development has placed gaming within the reach of average computer users.

Digital Signatures

A digital signature or digital signature scheme is a mathematical scheme for demonstrating the authenticity of a digital message or document. A valid digital signature gives a recipient reason to believe that the message was created by a known sender, and that it was not altered in transit. Digital signatures are commonly used for software distribution, financial transactions, and in other cases where it is important to detect forgery or tampering. This invention introduces a new application of the use of a digital signature. Signing, verifying and delivering authentic autographs via "digital signatures" to fans, collectors and/or others serves to create and enable a new autograph market. For example, an avatar (the graphical representation of the user or the user's alter ego or character) offers and/or provides a signed, verified and delivered authentic character autograph via "digital signature" to a third party. Also, by way of example, a human being offers and/or provides a signed, verified and delivered authentic autograph via "digital signature" to a third party.

BRIEF SUMMARY OF THE INVENTION

The following information contained in this "Summary" should be understood to be embodiments, not claims.

Systems, methods and software applications provide for merging a Virtual World, Live Events and an Entertainment Channel that create the "Holy Grail" of online gaming, broadcast shows and live entertainment (aka "The Perfect Storm"). These systems, methods and software applications enable the creation of a social network game that is played within a Virtual World that comes to life in Live Events, while rewarding and energizing the entrepreneurial owners, player participants and fan base in a manner that can stimulate viral growth online and offline.

According to an aspect, the self-proclaimed "Holy Grail" of online gaming, broadcast shows and live entertainment (aka "The Perfect Storm") merges (1) a Virtual World that contains a social network game (e.g., an online fantasy sports league), including an online gaming platform for avatars to interact with fans online; (2) Live Events that push a portion of the avatars to life in a Real World sports league, with real competition for real cash and improvisational drama; and (3) an Entertainment Channel that airs content (e.g., ESPN meets Comedy Central) that excites and informs the fan base while marketing the fantasy sports league and Live Events. These three branches of the "Holy Grail" of online gaming, broadcast shows and live entertainment (aka "The Perfect Storm") generate, via desktop computers, mobile devices and in-person venues, one or more of the following: Advertising revenues, merchandise sales (e-Commerce, licensing and in-person), online micro-transactions (single virtual items and virtual item packs), sponsorship receipts, subscription fees (monthly and yearly), gate fees (per person admissions), pay-per-view charges, content distribution charges and other sources of income. "The Perfect Storm" is used to describe an actual phenomenon that happens to occur in such a confluence, resulting in an event of unusual magnitude.

According to an aspect, a Virtual World contains a social network game (e.g., an online fantasy sports league) where the characters are (1) represented by actual human beings (users) who have signed up to be avatars of characters (the graphical representation of a user's character); (2) supported by a "Character Service Center" that creates and enhances each character's basic profile and controls the interactive communications of the character, the live human being behind the character and the character's fans; and (3) rewarded by a "Collaboration Incentive Platform" that computes and allocates (1) to the characters a percentage of revenues generated by the characters and ranking points through their game playing, signing autographs, issuing endorsements, making public appearances and/or performing a variety of other acts and (2) to the players redeemable points through their game playing, in-game purchasing, watching programs, viewing sponsor advertisements, signing autographs, issuing endorsements, making public appearances and/or performing a variety of other acts. Within the context of the self-proclaimed "Holy Grail" of online gaming, broadcast shows and live entertainment (aka "The Perfect Storm"), a Virtual World sports league and a Real World sports league grow concurrently by broadcasting promotional material and other communications via websites, blogs, web-casts, email-blasts, tweets and social media outlets (e.g., Facebook, Twitter, etc.), using the "Character Service Center," while incentivizing the multi-players and others, using the "Collaboration Incentive Platform.

According to an aspect, multiple human beings (be they players, fans or others) can join the game and the creative process. For example, fans can participate (as an individual character or a team member behind the character) in everything from creating, naming, promoting and/or playing. The Virtual World could grow with many characters and teams throughout the world.

According to an aspect, just as the cream rises among the Virtual Characters into the Real World via fan popularity, the future growth of the league can be fan-directed in part. This would of course work for an adult entertainment entity to use our platform for their fans to pick their next Starlets, etc. where contests, special events, lotteries, skill tests, etc. could be used to enable fans individually or collectively to become involved and incentivized in doing so.

According to an aspect, multi-players compete via collective use of avatars in a Virtual World sports league for rewards and/or to push a portion (e.g., 20%) of the avatars to life in a Real World sports league wrapped in an "Improvisational Sports Theatre" act based on a professional sport where the athletes are actors competing for cash prizes while staying in character, thus blending the Virtual World and Real World by populating each such world with the same characters (e.g., the top 20% of winners in the Virtual World migrate to compete in the Real World).

According to an aspect, athletes compete in a Real World sports league for rewards and/or to push a portion (e.g., 20%) of real world sports league competitors to avatar status in a Virtual World sports league, with virtual competition for real cash prizes and online drama, thus blending the Virtual World and Real World by populating each such world with the same characters (e.g., the top 20% of winners in the Real World migrate to compete in the Virtual World).

According to an aspect, authentic autographs via "digital signatures" (a digital signature/autograph that is signed and verified) are created for fans, collectors and/or others that serve to create and enable a new autograph market, that of "digital signatures" [e.g., an avatar (the graphical representation of the user or the user's alter ego or character) or a human being offers and/or provides a signed, verified and delivered authentic autograph via "digital signature" to a third party].

DETAILED DESCRIPTION OF THE INVENTION

Figure 1:
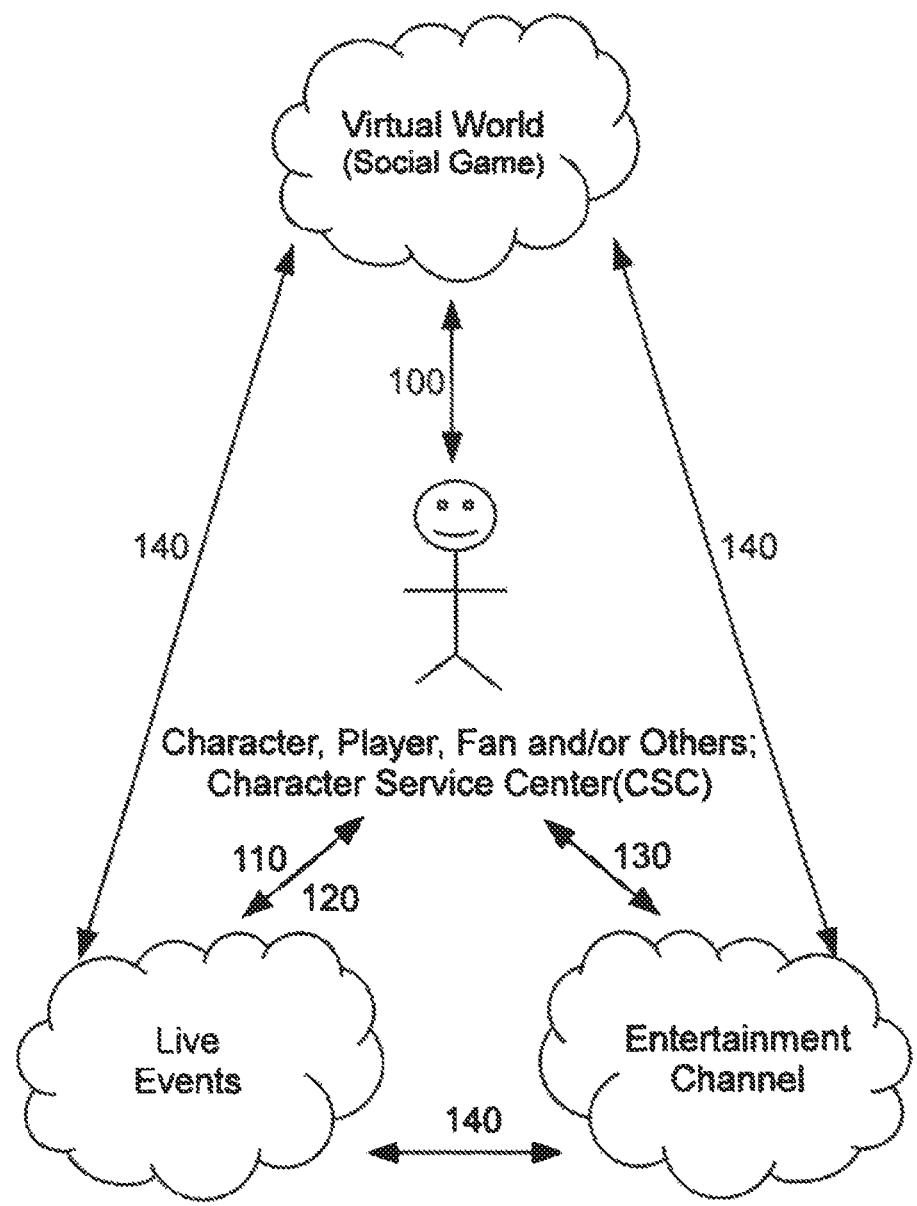
FIG. 1 shows an example of the self-proclaimed "Holy Grail" of online gaming, broadcast shows and live entertainment (aka "The Perfect Storm") that merges the Virtual World, Live Events and an Entertainment Channel, according to some embodiments.

The following information contained in this "Detailed Description" should be understood to be a guide to interpreting the present application.

Terms

The term "product" means any machine, manufacture and/or composition of matter, unless expressly specified otherwise.

The term "process" means any process, algorithm, method or the like, unless expressly specified otherwise.

Each process (whether called a method, algorithm, or otherwise) inherently includes one or more steps, and therefore, all references to a "step" or "steps" of a process have an inherent antecedent basis in the mere recitation of the term "process" or a like term. Accordingly, any such reference in a claim to a "step" or "steps" of a process has sufficient antecedent basis.

The term "invention" and the like mean "the one or more inventions disclosed in the present application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising", and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of, or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of" (when such phrase modifies a plurality of things) does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represents" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e. instructions) over the Internet", the term "i.e." explains that "instructions" are the "data" that the computer sends over the Internet.

The term "respective" and like terms mean "taken individually", thus if two or more things have "respective" characteristics, then each such thing has its own characteristic, and these characteristics can be different from each other but need not be different. For example, the phrase "each of two machines has a respective function" means that the first such machine has a function and the second such machine has a function as well. The function of the first machine may or may not be the same as the function of the second machine.

Any given numerical range shall include whole and fractions of numbers within the range. For example, the range "1 to 10" shall be interpreted to specifically include whole numbers between 1 and 10 (e.g., 1, 2, 3, 4 . . . 9) and non-whole numbers (e.g., 1.1, 1.2 . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" being synonymous with "including but not limited to", the mere usage of the phrase "including but not limited to" does not mean that the term "including" means something other than "including but not limited to."

Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionalities that are described as being possessed by more than one device or article may alternatively be possessed by a single device/article.

The functionality and/or the features of a single device that is described may be alternatively embodied by one or more devices which are described but are not explicitly described as having such functionality/features. Thus, other embodiments need not include the described device itself, but rather can include the one or more other devices which would, in those other embodiments, have such functionality/features.

Disclosed Examples and Terminology are Not Limiting

Neither the Title (set forth at the beginning of the first page of the present application) nor the Abstract (set forth at the end of the present application) is to be taken as limiting in any way the scope of the disclosed invention(s), is to be used in interpreting the meaning of any claim, or is to be used in limiting the scope of any claim. An Abstract has been included in the present application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of the features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devises that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for a long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products. or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or preformed, as the case may be.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer readable medium" refers to any medium, a plurality of the same, or a combination of different media that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicated that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g., the Internet, LAN, WAN or Ethernet, Token Ring, a telephone line, a cable line, a radio channel, an optical communications line, commercial on-line service providers, bulletin board systems, a satellite communications link, or a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment, the process may operate without any user intervention. In another embodiment, the process includes some human intervention (e.g., a step is performed by or with the assistance of a human being).

Continuing Applications

The present disclosure provides, to one of ordinary skill in the art, an enabling description of several embodiments and/or incentives. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specifications, and equivalents thereof, may perform additional functions as well as the specified function.

Computers, processors, computing devices and similar products are structures that can perform a variety of functions. Such products can be operable to perform a specified function by executing one or more programs, such as a program stored in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, or (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

Incorporation by Reference

Any patent, patent application or other document referred to herein is incorporated by reference into the present application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in the present application.

Prosecution History

In interpreting the present application (which includes the claims), one of ordinary skill in the art shall refer to the prosecution history of the present application, but not to the prosecution history of any other patent or patent application, regardless of whether there are other patent applications that share a claim of priority with the present application.

Figures Described

A detailed description of embodiments of systems, methods and software applications is illustrated by way of example, and not by way of limitation, in the figures of the accompanying drawings, wherein like numerals designate corresponding parts in the several drawings.

FIG. 1 shows an example of the self-proclaimed "Holy Grail" of online gaming, broadcast shows and live entertainment (aka "The Perfect Storm") that merges the branches referred to individually as: (a) Virtual World, (b) Live Events and (c) Entertainment Channel, according to a preferred embodiment of the invention, where Step 100 depicts characters, players and fans entering the Social Game to enjoy competing, playing and/or following the game and its events, including those engaged in the competition. The players compete within the Virtual World, playing the Social Game, to push a portion of the characters to life in a Real World sports league where Step 110 depicts winning characters migrating to Live Events, thus blending the Virtual World and Real World by populating each such world with the same characters (e.g., the top 20% of winners in the Virtual World sports league come to life in a Real World sports league, with real competition for real cash and improvisational drama). Step 120 and Step 130, respectively depict everybody viewing the Live Events and Entertainment Channel. Step 140 and the other discussed steps depict the routes (each of the bi-directional arrows) of the all-inclusive flow of data going one way or the other, and/or back and forth, amongst the three branches and their characters, players and fans, where, for example, the Virtual World (Social Game) sees the rise of statistics, the ranking up of characters, the leveling up of players and the rewarding of fans, as computed by the "Collaboration Incentive Program" that connects the characters, players and fans within the data silo of this platform and elsewhere, for example. Computer data is entered by everybody manually and/or automatically with cookies being present on their computers in order to enable the collection of data for computational use within the Collaboration Incentive Platform.

Figure 2:
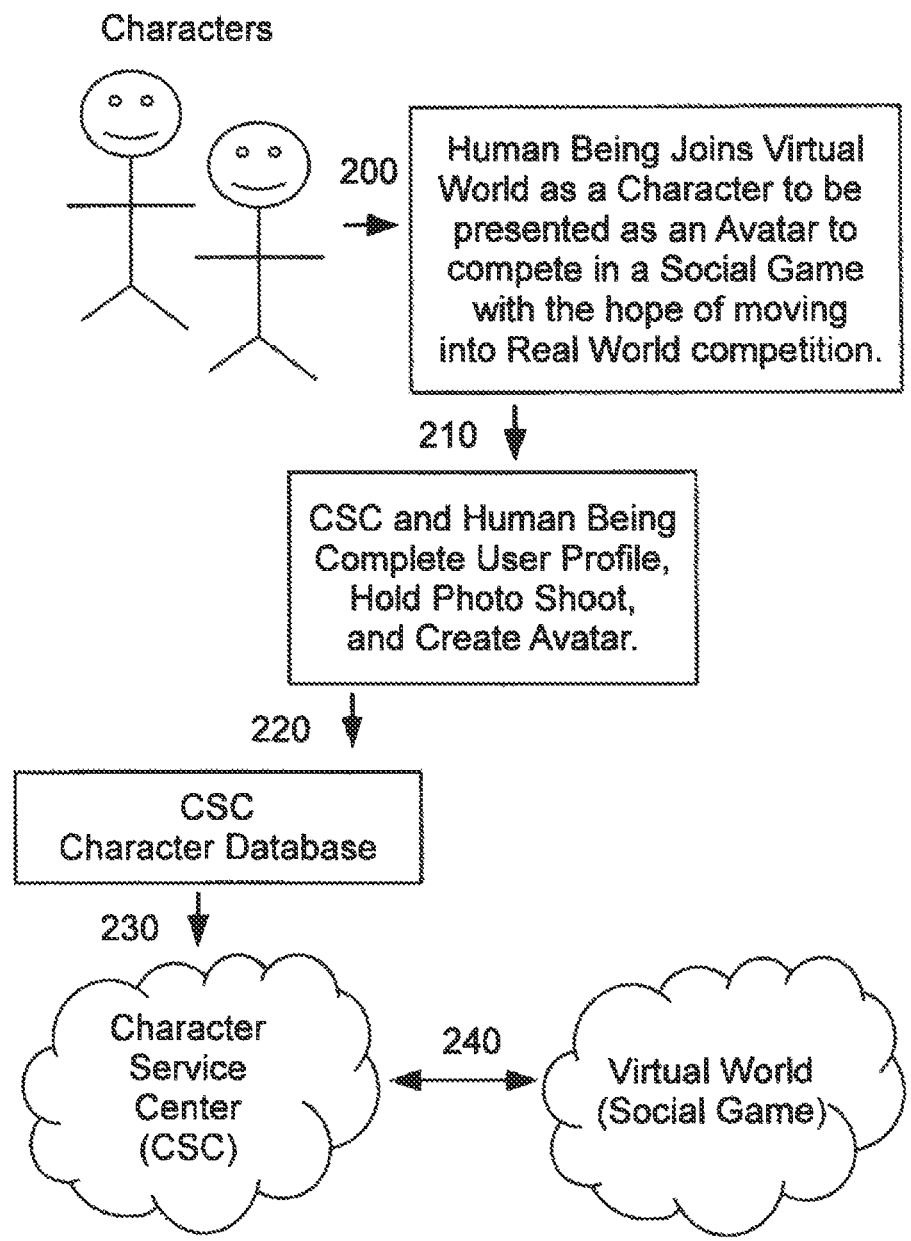
FIG. 2 shows an example of a social network game where the characters are represented by actual human beings (users) who have signed up to be avatars of characters, according to some embodiments.

FIG. 2 shows an example of a Virtual World that contains a social network game (e.g., an online fantasy sports league) where the characters are represented by actual human beings (users) who have signed up to be avatars of characters (an "avatar" is the graphical representation of the users' character). The characters are (1) depicted in Step 200 as represented by actual human beings (users) who sign up to be avatars of characters (the graphical representation of a user's character), according to a preferred embodiment of the invention; (2) depicted in Step 210 as supported by a "Character Service Center" that completes user profiles, holds photo shoots and creates avatars; (3) depicted in Step 220 as entering their character information into the "Character Service Center's" database; (4) depicted in Step 230 as seeing the "Character Service Center" standing ready to enter into the Virtual World (social game) with them in Step 240.

Figure 3:
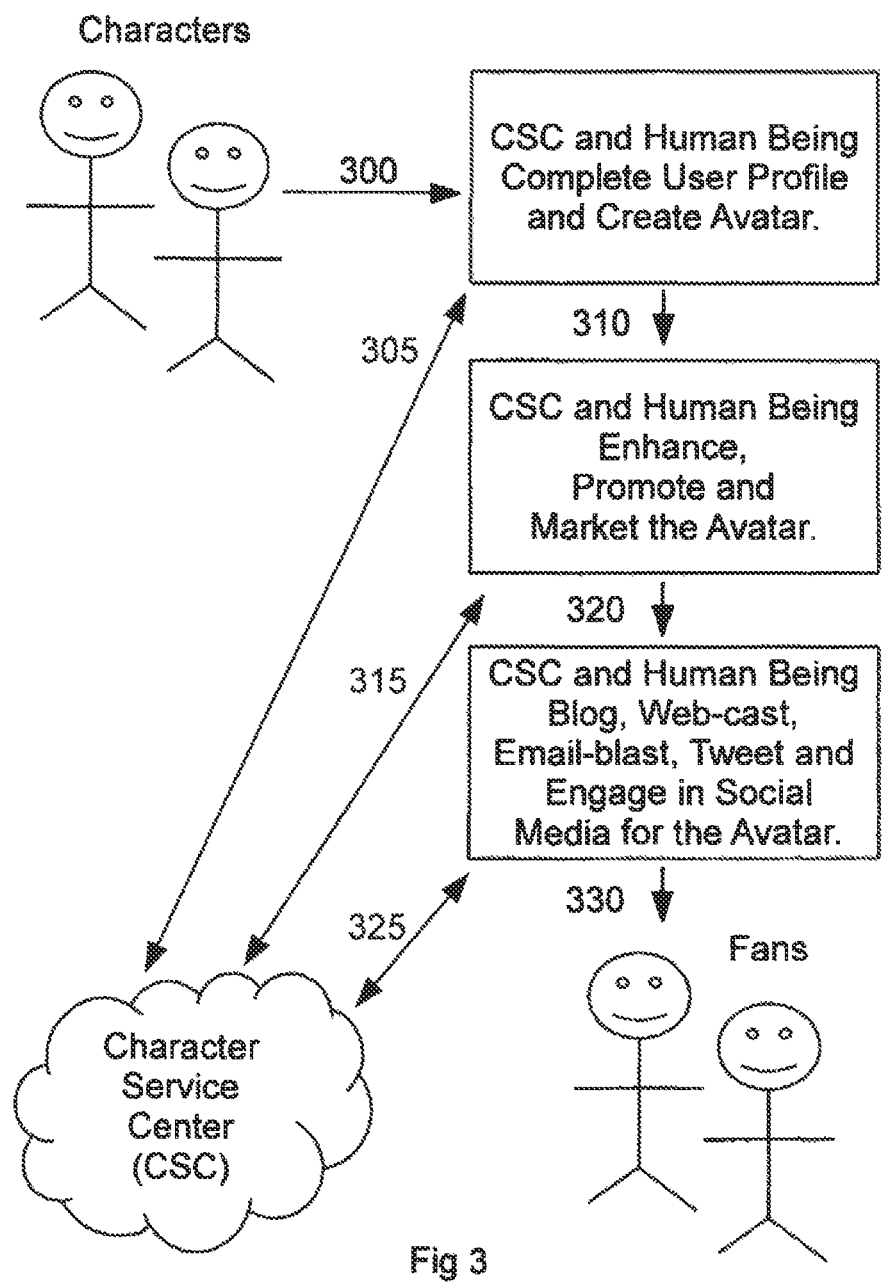
FIG. 3 shows an example of a "Character Service Center," according to some embodiments.

FIG. 3 shows an example of a "Character Service Center," according to a preferred embodiment of the invention where (1) Step 300 depicts the live human being behind the character allowing the "Character Service Center" to act alone, or in association with such live human being, regarding the character, and acknowledges that the "Character Service Center" owns all proprietary rights to the created and enhanced character and its "avatar," but not the individual that is the live human being (user) behind the character; (2) Step 310 depicts the completion of the character's user profile and the creation of the avatar via a photograph, a drawing and/or any representation; (4) Step 320 depicts enhancing promoting and marketing the avatar; (5) Step 330 depicts blogging, web-casting, email-blasting, Tweeting and engaging in social media for the avatar regarding the interactive communications of the character, the live human being behind the character and the character's fans. The Steps described above regarding FIG. 2 are accomplished by interaction between the "Character Service Center" and the human being, as depicted in Steps 305, 315 and 325. The "Character Service Center" by enabling, leading and/or assisting characters, technologically and otherwise, regarding the social game and otherwise, pushes characters to their fullest potential. For example, the Character Service Center broadcasts original programming based on the Virtual World and Live Events (e.g., Comedy Central Meets ESPN) via the Entertainment Channel while acting as the voice of evangelism, created to excite, inform and grow the fan base while promoting the Virtual World and Live Events as depicted in FIG. 5 that shows the "Character Service Center," characters, players and fans standing at the center of the "Holy Grail" of online gaming, broadcast shows and live entertainment (aka "The Perfect Storm").

Figure 4:
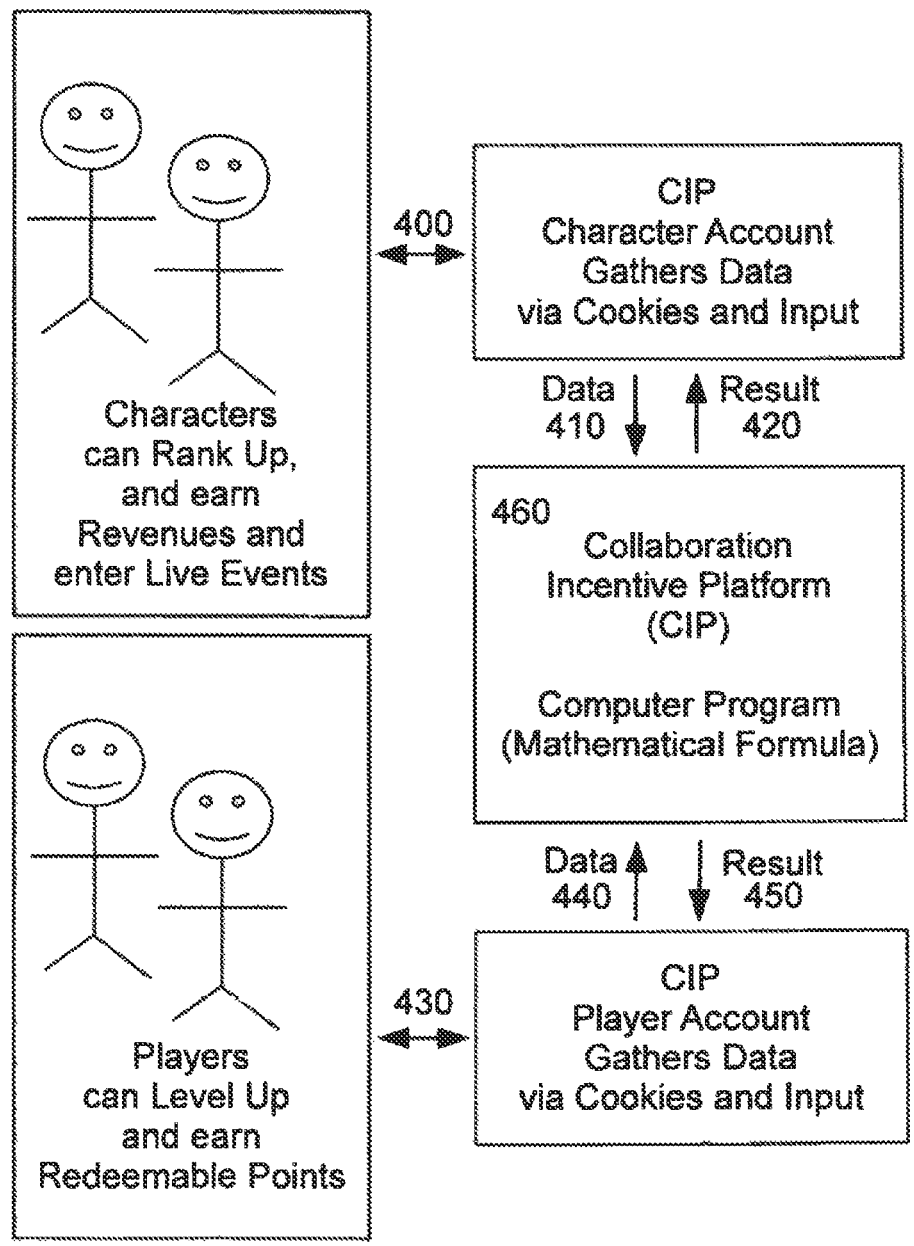
FIG. 4 shows an example of a "Collaboration Incentive Platform," according to some embodiments.

FIG. 4 shows an example of a "Collaboration Incentive Platform" where (1) Step 400 depicts the method of characters participating in activities, such as game playing, in-game purchasing, watching programs, viewing sponsor advertisements, signing autographs, issuing endorsements, making public appearances and/or performing a variety of other acts that generate revenues and ranking points for the characters that are tracked and scored, and then computed and allocated to the eligible characters via a "Collaboration Incentive Platform," according to a preferred embodiment of the invention and (2) Step 430 depicts the method of players participating in activities, such as game play, in-game purchases, watching programs, viewing sponsor advertisements, signing autographs, and/or performing a variety of other acts that generate redeemable points for the players that are tracked and scored, and then computed and allocated to the players via a "Collaboration Incentive Platform," according to a preferred embodiment of the invention. As shown in Step 460, there is an infrastructure for characters and players, who develop, share, communicate, collaborate and/or co-create to earn more, based on such measurable contributions, thus incentivizing them and thus mobilizing them to contribute more, because they will realize more. They are incentivized by computing, allocating and rewarding cash and/or game points ("Incentives") based on data collected from the Internet via the "Collaboration Incentive Platform," using a "Mathematical Formula" that resides within a computerized network with such network including an appropriate central processing unit ("CPU"), hardware, software and databases that enable data collection and number crunching, according to a preferred embodiment of the invention. Further, in Step 410 and Step 420 the "Collaboration Incentive Platform" receives and delivers data and results, respectively, to the characters' accounts whereby such collections and transmissions are enabled by cookies and input. In addition, in Step 440 and Step 450 the "Collaboration Incentive Platform" receives and delivers data and results, respectively, to the players' accounts whereby such collections and transmissions are enabled by cookies and input.

Figure 5:
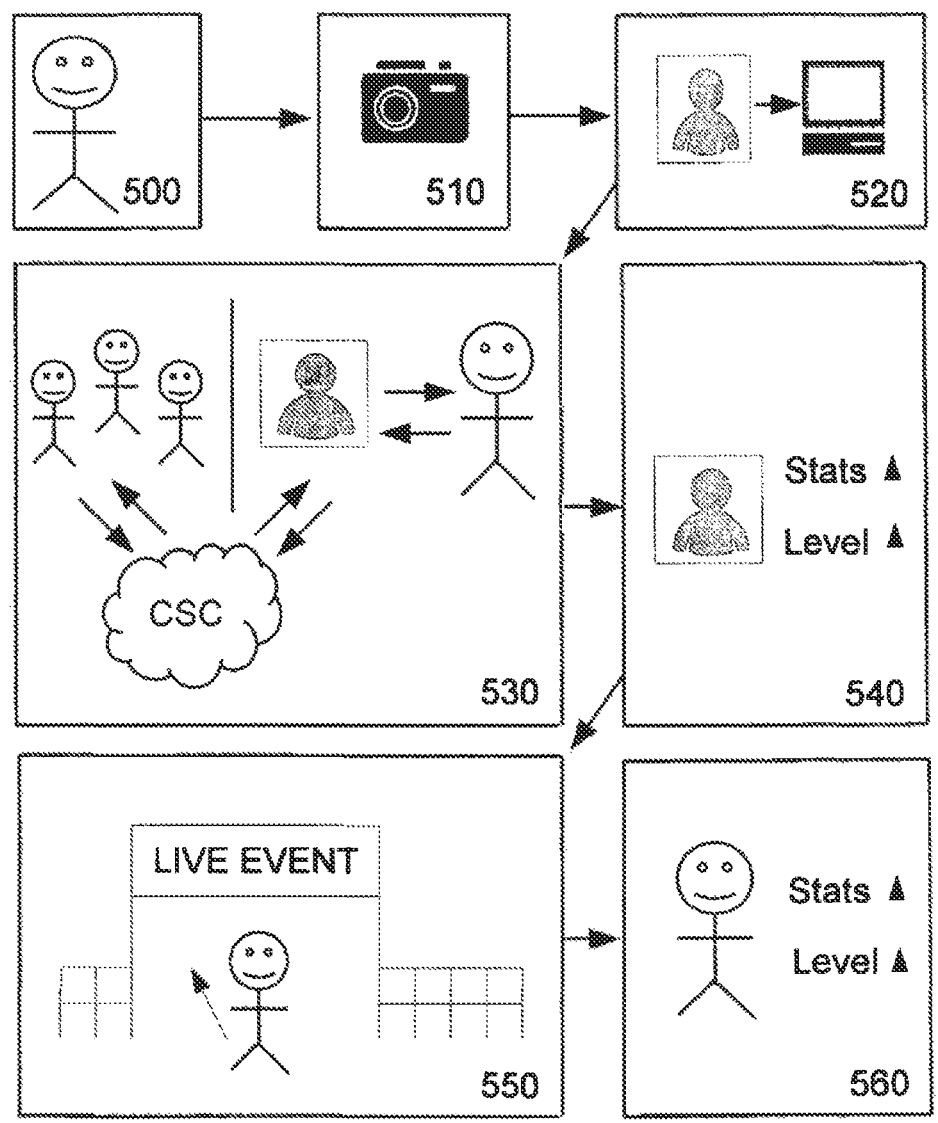
FIG. 5 shows an example of avatars being brought to life in Live Events, according to some embodiments.

FIG. 5 shows an example of players competing via collective use of avatars in a Virtual World sports league for rewards and/or to push a portion (e.g., 20%) of the avatars to life in a Real World sports league wrapped in an "Improvisational Sports Theatre" act based on a professional sport where the athletes are actors competing for cash prizes while staying in character, according to a preferred embodiment of the invention. Step 500 depicts a human being cast as a character to be presented as an avatar to compete in a Social Game with the hope of moving into Real World competition; followed by such human being in Step 510 working with the Character Service Center to complete a user profile, hold a photo shoot and create the avatar for uploading in Step 520 to the Character Service Center's character database and entrance into the Social Game; at which time in Step 530 you see the human acting as a character and interacting with fans through the Character Service Center; then in Step 540 through increased popularity based on character statistics kept by the Character Service Center the character ranks up; next in Step 550 character reaches top tier and appears in a Live Event and/or a show on the Entertainment Channel; and upon achieving top tier status the character in Step 560 receives bonus statistics and moves to a special status.

Figure 6:
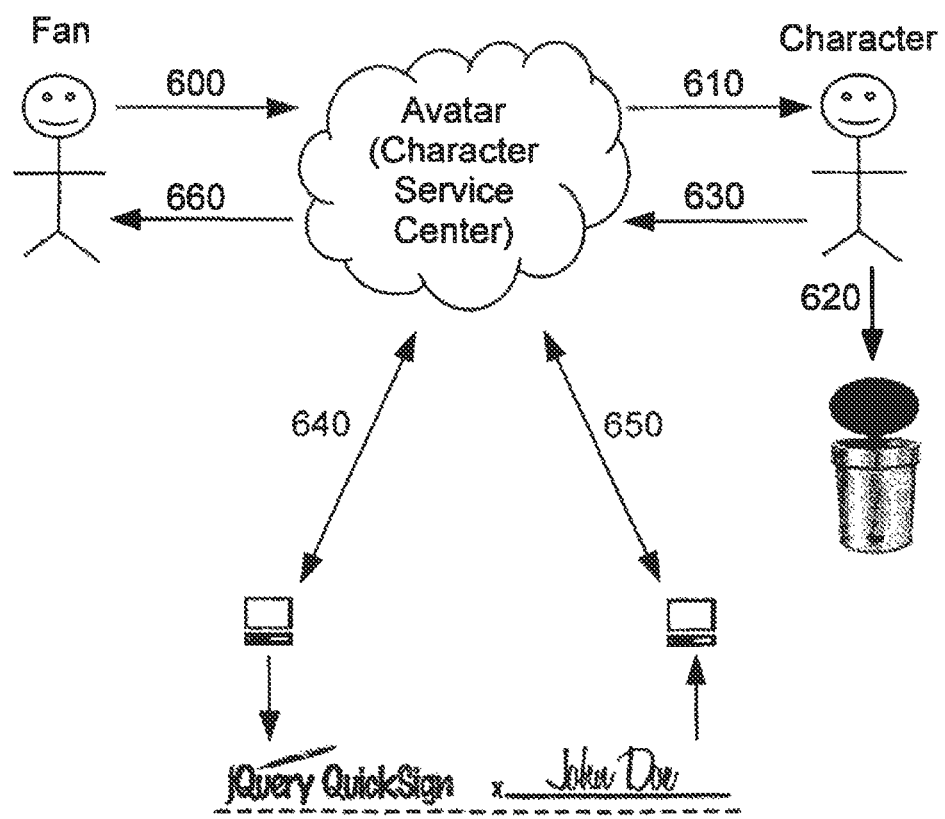
FIG. 6 shows an example of signing, verifying and delivering authentic autographs via "digital signatures," according to some embodiments.

FIG. 6 shows an example of the creation of an authentic autograph via "digital signature" (a digital signature/autograph that is signed and verified) for fans, collectors and/or others that serves to create and enable a new autograph market, that of "digital signatures" [e.g., either (1) an avatar (the graphical representation of the user or the user's alter ego or character) or (2) a human being provide a signed, verified and delivered authentic autograph via "digital signature" to a third party] where Step 600 depicts a fan requesting via a fan account a signature on a provided image, or a requested image, where the image will be accessed and returned by the character via the Character Service Center (CSC), according to a preferred embodiment of the invention. Upon receipt of the request, the CSC processes it as follows: In Step 610 the request is forwarded to the character who decides in Step 620 "no" (the process ends) or in Step 630 "yes" (the process continues), in which case the request is fulfilled by signing in Step 640, where a signature plugin, such as: "Jquery Quick Sign," or other signature software, is used to digitally attach the character's signature (the signature of the person representing the character) to the provided or requested image (any digital image or electronic file) through using a computer mouse, or stylus and touch pad, that enables signing, followed by an automated process, such as what is available in "Adobe Lightroom" to (1) embed metadata verifying the authenticity of the signature, where for example, text is inserted stating the date and time of the signature and to whom the signature was directed to, and (2) "lock" the electronic file, so it cannot be altered, and then in Step 650 the signature is verified, and the process is completed in Step 660 when the signed file is placed in the fan's account for the fan to download it onto the fan's computer for printing and any other permitted use.

Figure 7:
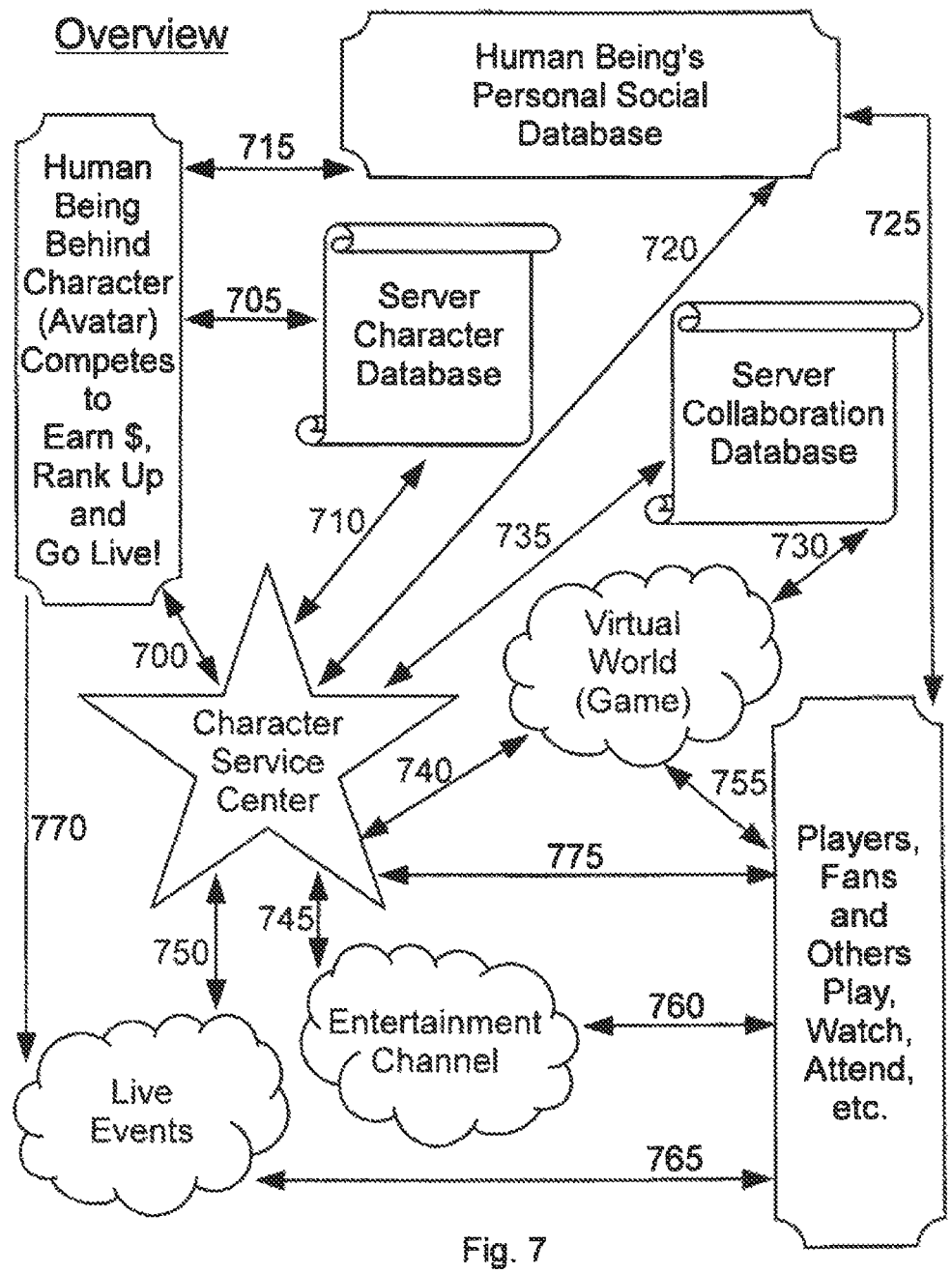
FIG. 7 shows an example of an overview of the present inventions contained in this patent application, according to some embodiments.

FIG. 7 shows an example of an overview of the inventions contained in this patent application, according to some embodiments, as more fully described elsewhere in this patent application, where Step 700 depicts a Human Being joining the Virtual World via the "Character Service Center" (CSC) as a Character to be presented as an avatar to compete in a social game to earn money, rank up and go live; where Steps 705 and 710 depict CSC and Human Being completing a user profile and creating an avatar using a photograph, a drawing and/or any representation via interaction between CSC, Human Being and/or technology, such as computers, processors, computing devices and similar products that can perform a variety of functions; where Step 715 depicts the result of a Human Being creating and maintaining, via computerized technology, social interaction that develops connections between friends, families, associates, businesses, organizations and others that are stored and available as "Contacts" within a computerized database; where Step 720 depicts CSC's access to Human Being's Contacts for purposes of promoting and marketing to them, either doing so independently or in conjunction with Human Being's assistance; where Step 725 depicts CSC and/or Human Being blogging, web-casting, email-blasting, tweeting and engaging in social media for the avatar for purposes of communicating with characters, players, fans and others for a variety of purposes, such as promoting and marketing; where Step 730 depicts the Virtual World (Social Game) gathering data via cookies and input from Characters, Players, Fans and others that is deposited/stored/accessed via a computerized server associated with the "Collaboration Incentive Platform" that computes via software and mathematical formulas such things as Character ranking, earnings and wins, and Player leveling and earnings; where Step 735 depicts the CSC's computerized access to such collaboration database for providing input and receiving output that is used in the furtherance of the Social Game, its promotion, its marketing, etc., including interactive contact (of all kinds) with all of the various touch points within the invention, such as the Virtual World, Entertainment Channel and Live Events (Steps 740, 745, and 750), including each of their respective interactive contacts (of all kinds) with their Characters, Players, Fans and Others, and these parties direct contact with the CSC (Step 775); where Steps 755, 760, and 765 depicts Characters, Players, Fans and Others interacting with the Virtual World, the Entertainment Channel and Live Events, as they play the social game, view broadcasted entertainment and attend live sporting events; where Step 770 depicts a winning Character's entry into Live Event competition; and where Step 775 depicts the path to somebody obtaining a digital signature, as more fully described in FIG. 6, plus the path of interactive contact for Characters, Players, Fans and Others with the CSC.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Implementation and Application

The systems and methods disclosed herein are implemented by suitable computer systems, data based and through the Internet, an Intranet and/or elsewhere. An appropriate central processing unit ("CPU"), hardware, software and databases are used to operate the online social network game, create character avatars (via either in person interaction with the "Character Service Center," electronic interaction with the "Character Service Center" or a combination of both, by a person or group of persons, whether such person or persons sign up initially or otherwise (individually or collectively) to be a character, player, fan, etc.), maintain character accounts, maintain player accounts, maintain fan accounts, drive marketing campaigns, promote product sales, expose vendor advertisements, publish gaming content, deliver sports applications, broadcast sports entertainment, rally the characters, rally the players, rally the fans, promote various referrals, gather celebrity endorsements and process data for the use and application of the "Character Service Center" and the "Collaboration Incentive Platform." This invention represents the development of an integrated multi-platform that embraces and promotes social transmedia optimization via a conduit for bringing characters, players, fans, entertainment and products together, while bringing entertainment distributors and product manufacturers an ever-expanding lucrative fan-base demographic.

Other Uses

These inventions, as described above, focus on an on-line Virtual World sports league and an off-line Real World sports league coupled with an Entertainment Channel, but these inventions could be used in other fields, businesses and industries.

Any individual, group of individuals and/or entity might want to develop the "Holy Grail" of online gaming, broadcast shows and live entertainment that merges the Virtual World, Live Events and an Entertainment Channel (aka "The Perfect Storm") whereby a social network game is rolled-out in the Virtual World where users compete to push a portion of the avatars to life in a Real World venue, via collective use of those avatars by multi-players inspired by the "Collaboration Incentive Platform," thus blending the Virtual World and Real World by populating each such world with the same characters (e.g., the top 20% of winners in the Virtual World migrate to compete in the Real World).

For example, without limitation:
  Any "Adult Only" and/or "XXX" entity, whether on-line (Internet based) or off-line (non-Internet based) might want to use these inventions in connection with any number of venues, in any number of ways, for any number of purposes, such as a beauty contest, a theatrical play, a reality show, a music competition, an adult game, a gambling venture, a pornographic event, a marketing campaign, a consensus poll, an organizing endeavor, etc.

"Adult Only" includes individuals of a minimum required age, such as 21 and/or any other minimum age threshold, where these individuals are granted access, while others under such age are not granted access.

.XXX (pronounced "dot triple-X" or "dot x x x") is a sponsored top-level domain (sTLD) intended as a voluntary option for pornographic websites on the Internet. The sponsoring organization is the International Foundation for Online Responsibility (IFFOR). The registry is operated by ICM Registry LLC. The ICANN Board voted to approve the sTLD on 18 Mar. 2011. It went into operation on 15 Apr. 2011. A gTLD (generic top-level domain) for sexually explicit material was proposed as one tool for dealing with the conflict between those who wish to provide and access such material through the Internet, and those who wish to prevent access to it, either by children and adolescents, or by employees at their workplaces. Further, "XXX" will also refer to pornographic websites not specifically registered at ".XXX". For example, such registration might be at ".COM" or another top-level domain.

"Adult Only" and/or "XXX" can include, cover and involve, without limitation, entertainment, gambling, gaming, products, services, sports, venues, etc.

Any game development entity (of every kind and nature, for adults and/or minors) (e.g., Wii, Xbox, PlayStation, etc.) might want to use these inventions in connection with any number of venues, in any number of ways, for any number of purposes, such as a sporting production, an entertainment project, an adult game, educational program, health initiative, etc.

Any talent agency and/or celebrity (of every kind and nature, for adults and/or minors) might want to use these inventions in connection with any number of venues, in any number of ways, for any number of purposes, such as promoting careers, signing digital autographs, developing endorsements, creating businesses, attracting fans, etc.

Any business and/or profession (of every kind and nature, for adults and/or minors) might want to use these inventions in connection with any number of venues, in any number of ways, for any number of purposes, such as educating people, branding companies, marketing products, promoting health, organizing employees, mobilizing constituents, polling individuals, etc.

MODIFICATIONS AND VARIATIONS

While the above description refers to particular embodiments of the present inventions, it will be understood to those of ordinary skill in the art that modifications may be made without departing from the spirit thereof. The accompanying claims are intended to cover any such modifications as would fall within the true scope and spirit of the present inventions.

The three elemental sections (those being Virtual World, Live Events and Entertainment Channel) can be shuffled, interchanged, or reconfigured to cause the inventions to create "The Perfect Storm." The development and application of all three elemental sections might commence at the same time, or at different times.

The three elemental sections (those being Virtual World, Live Events and Entertainment Channel) can each function on their own or in unison with one or both of the other two.

The systems and methods disclosed herein apply to all variations of current, evolving, and future technology and processes that could otherwise adopt and use these systems and methods to achieve similar results. For example, these claimed systems and methods could otherwise be adopted and used in the television broadcast environment, radio broadcast environment, computer intranet environment, computer hard drive environment, computer network environment, wireless Internet, cellular environment, satellite environment, distance learning environment and elsewhere. They could also otherwise be adopted and used in any environment that enables individuals to share and/or access information, files, data, music, movies, pictures, conversation, plots, games, etc. by electronic or other means.

The invention claimed is:

1. A computer implemented system comprising one or more physical processors configured by machine-readable instructions to:
   store, in a character database, character profiles for a set of characters associated with real-world individuals;
   receive data indicating outcomes of live events involving one or more of the characters and real-world fans of the characters;
   update the character profiles based on the received data indicating the outcomes of the live events;
   receive a digital signature request from a real-world fan of a first character;
   provide the digital signature request to a first real-world individual based on the association between the first character and the first real-world individual;
   responsive to receiving an affirmative response to the digital signature request, obtain a digital item with a digital signature of the first real-world individual; and
   provide the digital item with the digital signature to the real-world fan of the first character.

2. The computer implemented system of claim 1, wherein the one or more physical processors are further configured by machine-readable instructions to:
   track one or more interactions between the characters and the real-world fans of the characters.

3. The computer implemented system of claim 2, wherein the one or more tracked interactions include performance by one or more of the characters in an instance of an online game, and the one or more physical processors are further configured by machine-readable instructions to:
   determine the characters that have at least a first level of performance in the instance of the online game.

4. The computer implemented system of claim 1, wherein the one or more physical processors are further configured by machine-readable instructions to:
   generate one or more communications on behalf of the characters.

5. The computer implemented system of claim 4, wherein generating one or more communications on behalf of the characters includes generating one or more communications via one or more of blogging, web-casting, email-blasting, or social media.

6. The computer implemented system of claim 1, wherein the one or more physical processors are further configured by machine-readable instructions to:
   track one or more real-world interactions involving the real-world individuals associated with the characters, wherein the real-world interactions include one or more of attending real-world events, watching programs, viewing sponsor advertisements, signing autographs, issuing endorsements, or making public appearances.

7. The computer implemented system of claim 6, wherein the one or more physical processors are further configured by machine-readable instructions to:
attach metadata to an electronic file containing the digital item with the digital signature to verify the authenticity of the digital signature; and
lock the electronic file containing the digital item with the digital signature such that the electronic file cannot be altered.

8. A non-transitory machine-readable storage medium encoded with instructions executable by one or more physical processors, the machine-readable storage medium comprising instructions to cause the one or more physical processors to:
store, in a character database, character profiles for a set of characters associated with real-world individuals;
receive data indicating outcomes of live events involving one or more of the characters and real-world fans of the characters;
update the character profiles based on the received data indicating the outcomes of the live events;
receive a digital signature request from a real-world fan of a first character;
provide the digital signature request to a first real-world individual based on the association between the first character and the first real-world individual;
responsive to receiving an affirmative response to the digital signature request, obtain a digital item with a digital signature of the first real-world individual; and
provide the digital item with the digital signature to the real-world fan of the first character.

9. The non-transitory machine-readable storage medium of claim 8, wherein the one or more physical processors are further configured by machine-readable instructions to:
track one or more interactions between the characters and the real-world fans of the characters.

10. The non-transitory machine-readable storage medium of claim 9, wherein the one or more tracked interactions include performance by one or more of the characters in an instance of an online game, and the one or more physical processors are further configured by machine-readable instructions to:
determine the characters that have at least a first level of performance in the instance of the online game.

11. The non-transitory machine-readable storage medium of claim 8, wherein the one or more physical processors are further configured by machine-readable instructions to:
generate one or more communications on behalf of the characters.

12. The non-transitory machine-readable storage medium of claim 11, wherein generating one or more communications on behalf of the characters includes generating one or more communications via one or more of blogging, web-casting, email-blasting, or social media.

13. The non-transitory machine-readable storage medium of claim 8, wherein the one or more physical processors are further configured by machine-readable instructions to:
track one or more real-world interactions involving the real-world individuals associated with the characters, wherein the real-world interactions include one or more of attending real-world events, watching programs, viewing sponsor advertisements, signing autographs, issuing endorsements, or making public appearances.

14. The non-transitory machine-readable storage medium of claim 13, wherein the one or more physical processors are further configured by machine-readable instructions to:
attach metadata to an electronic file containing the digital item with the digital signature to verify the authenticity of the digital signature; and
lock the electronic file containing the digital item with the digital signature such that the electronic file cannot be altered.

15. A method being implemented on a computer system having one or more physical processors executing computer program instructions which, when executed, perform the method, the method comprising:
storing, by the computer system, in a character database, character profiles for a set of characters associated with real-world individuals;
receiving, by the computer system, data indicating outcomes of live events involving one or more of the characters and real-world fans of the characters;
updating, by the computer system, the character profiles based on the received data indicating the outcomes of the live events;
receiving, by the computer system, a digital signature request from a real-world fan of a first character;
providing, by the computer system, the digital signature request to a first real-world individual based on the association between the first character and the first real-world individual;
responsive to receiving an affirmative response to the digital signature request, obtaining, by the computer system, a digital item with a digital signature of the first real-world individual; and
providing, by the computer system, the digital item with the digital signature to the real- world fan of the first character.

16. The method of claim 15, further comprising:
tracking, by the computer system, one or more interactions between the characters and the real-world fans of the characters.

17. The method of claim 16, wherein the one or more tracked interactions include performance by one or more of the characters in an instance of an online game, and the method further comprises:
determining the characters that have at least a first level of performance in the instance of the online game.

18. The method of claim 15, the method further comprising:
generating one or more communications on behalf of the characters.

19. The method of claim 18, wherein generating one or more communications on behalf of the characters includes generating one or more communications via one or more of blogging, web-casting, email-blasting, or social media.

20. The method of claim 15, the method further comprising:
tracking, by the computer system, one or more real-world interactions involving the real-world individuals associated with the characters, wherein the real-world interactions include one or more of attending real-world events, watching programs, viewing sponsor advertisements, signing autographs, issuing endorsements, or making public appearances.

21. The method of claim 20, the method further comprising:

attaching, by the computer system, metadata to an electronic file containing the digital item with the digital signature to verify the authenticity of the digital signature; and locking, by the computer system, the electronic file containing the digital item with the digital signature such that the electronic file cannot be altered.

\* \* \* \* \*